June 9, 1959 D. W. FRANKLIN ET AL 2,889,912
APPARATUS FOR DOWNTILTING HEAVY ARTICLES
Filed Feb. 15, 1956 3 Sheets-Sheet 3

INVENTORS:
DAVID W. FRANKLIN and
JAMES E. MINICK,
BY: Donald G. Dalton
their Attorney.

2,889,912
APPARATUS FOR DOWNTILTING HEAVY ARTICLES

David W. Franklin, Monroeville, and James E. Minick, Pittsburgh, Pa., assignors to United States Steel Corporation, a corporation of New Jersey Application February 15, 1956, Serial No. 565,696

10 Claims. (Cl. 198—33)

This invention relates to an improved apparatus for downtilting heavy articles.

Our apparatus is especially suited for downtilting coils of metal strip as they are handled in a processing mill, although obviously the invention is not thus limited, but has application wherever similar problems are encountered. In the usual strip mill, coils of strip are stored with their central axes upright. To move a coil into a processing line, it is placed on a conveyor which carries it toward an uncoiler at the entry end of the line. However, the coil must be downtilted 90° so that its central axis is horizontal before the uncoiler can engage it. Conventionally downtilting a coil necessitates transferring it from one conveyor to another. The usual downtilting apparatus includes a cradle which receives the coil from the first conveyor, turns it 90° about a horizontal axis, and deposits it on a second conveyor.

An object of our invention is to provide an improved downtilting apparatus which eliminates the need for a second conveyor, that is, an apparatus which downtilts an article as it travels along a single conveyor.

A further object is to provide an improved downtilting apparatus adapted automatically to clamp an upright cylindrical article traveling on a conveyor, turn the article a quarter revolution about a horizontal axis, and replace the article on the same conveyor with its central axis horizontal.

In accomplishing these and other objects of the invention, we have provided improved details of structure, a preferred form of which is shown in the accompanying drawings, in which.

Figure 1:
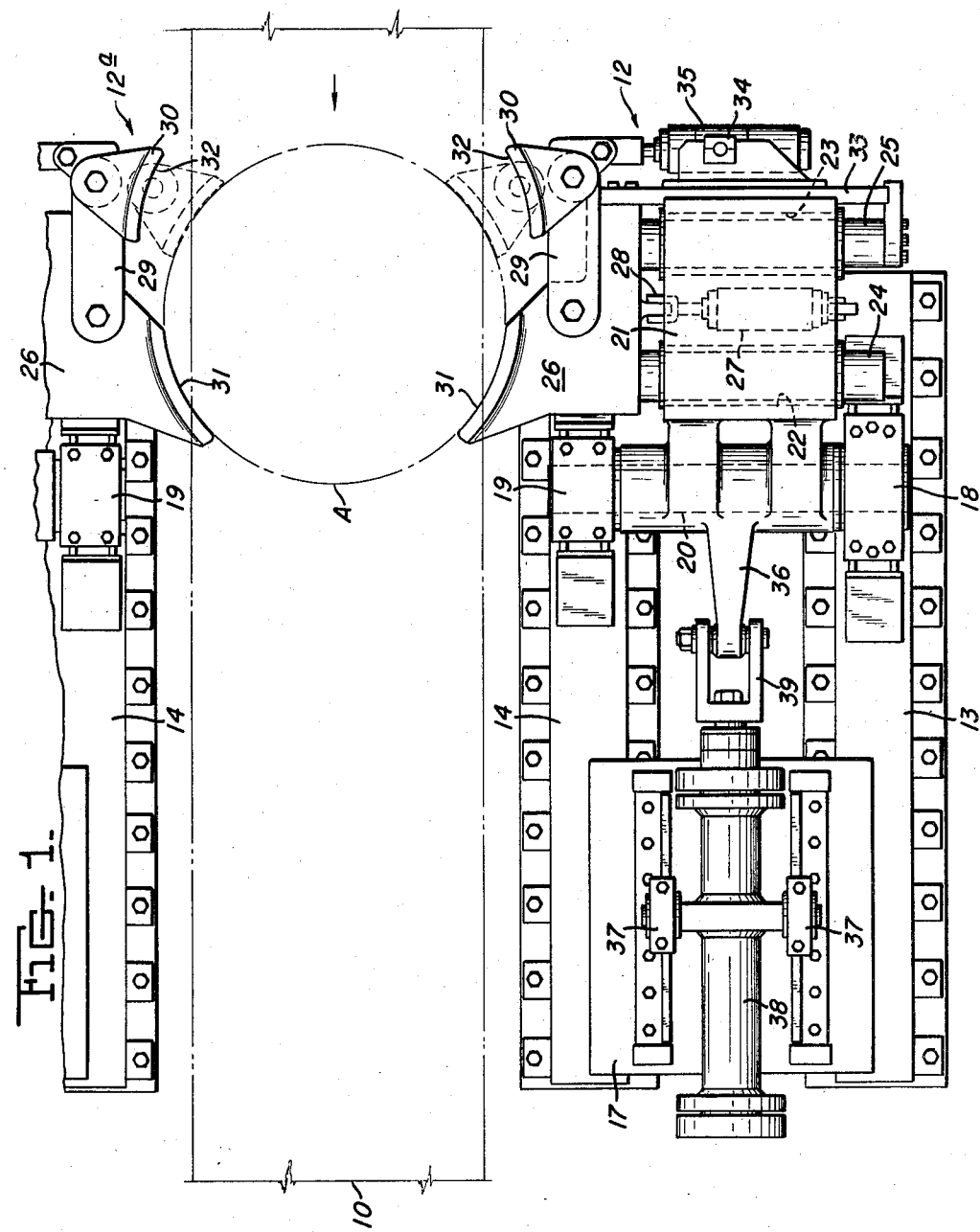
Figure 1 is a top plan view of my improved downtilting apparatus.
Figure 2:
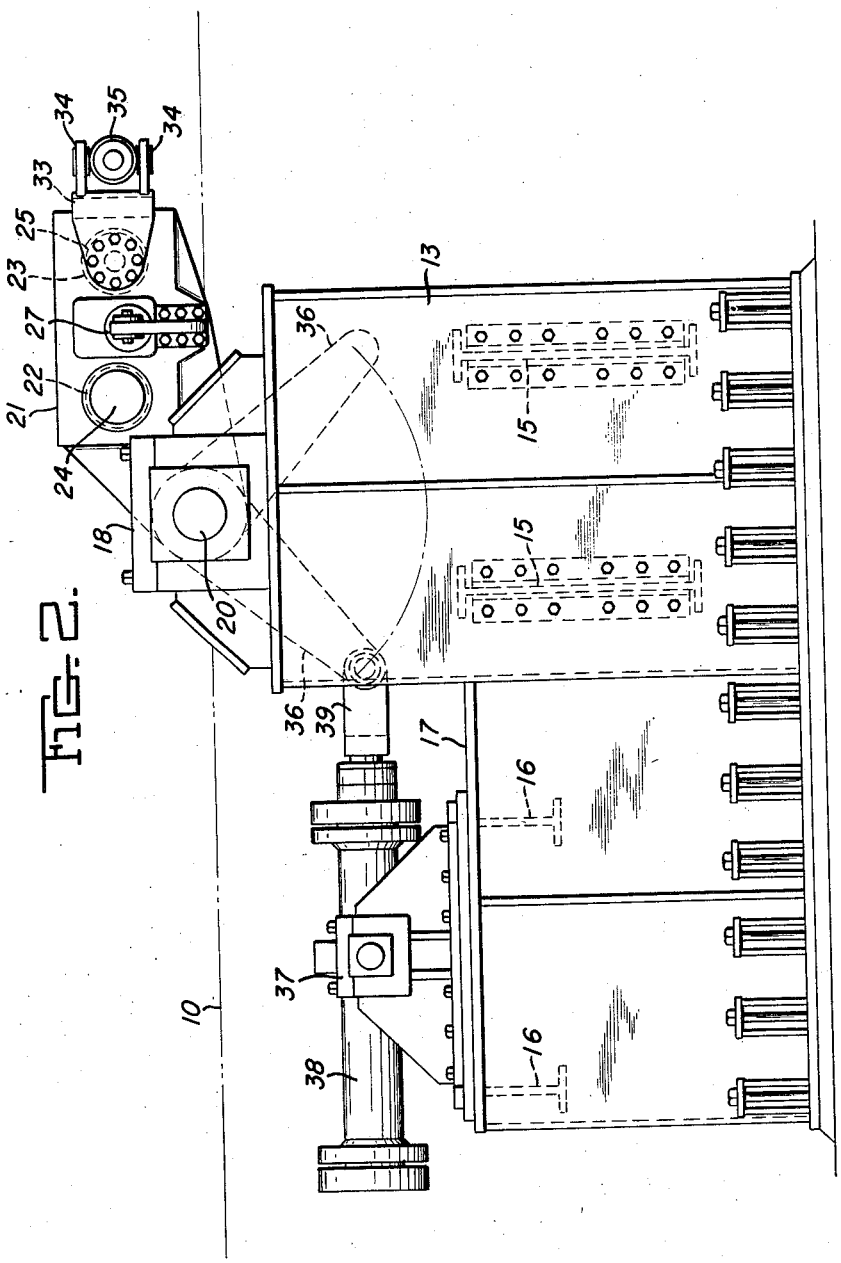
Figure 2 is a side elevational view of the apparatus.
Figure 3:
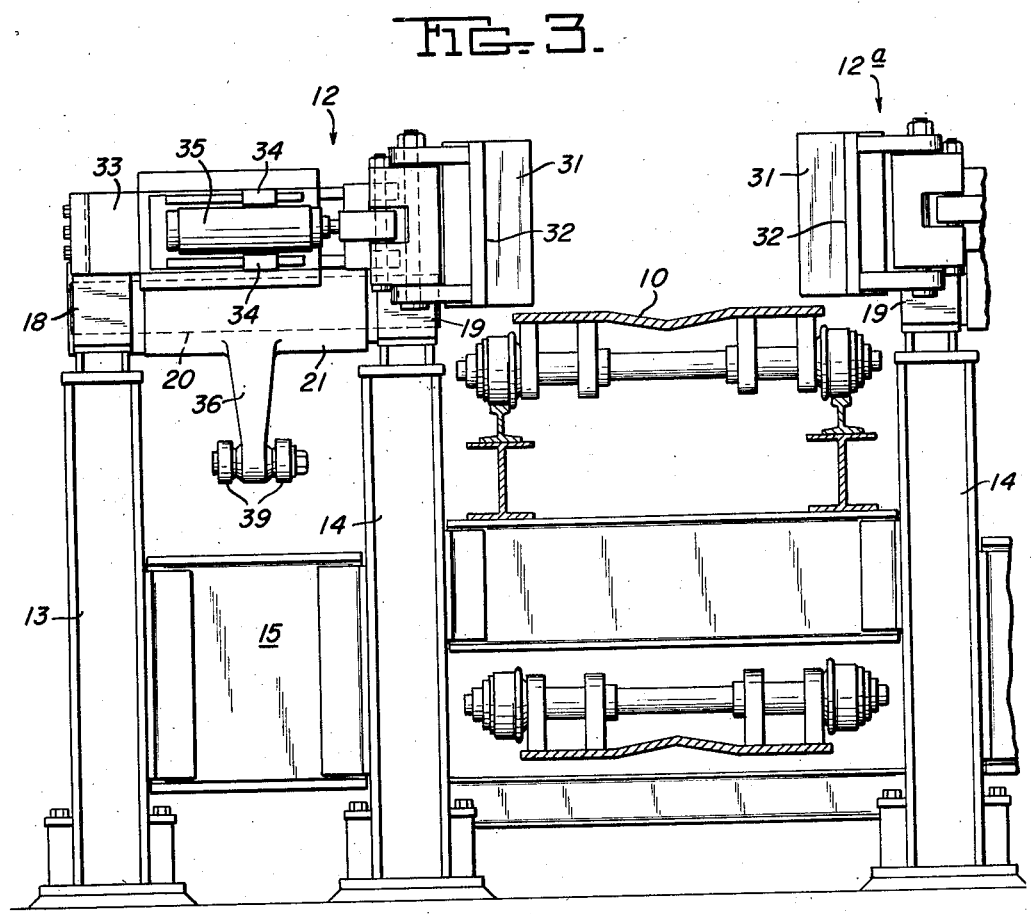
Figure 3 is an end elevational view of the apparatus.

The drawings show somewhat schematically a conventional conveyor 10 which travels from right to left as viewed in Figures 1 and 2 and carries heavy cylindrical articles A. Initially the articles are upright, but our downtilting apparatus turns them to a position where their central axes are horizontal. Our apparatus includes two handling mechanisms 12 and 12a which are situated at opposite sides of the conveyor and are alike except that they are of opposite hand. Therefore it is necessary to describe only one of them in detail.

The handling mechanism 12 has a frame which is formed of spaced apart outer and inner uprights 13 and 14, a pair of transverse members 15 connecting said uprights adjacent the entry end of the mechanism, another pair of transverse members 16 connecting said uprights adjacent the exit end, and a platform 17 spanning the uprights at the exit end portion. The entry end portions of the uprights 13 and 14 are higher than the platform 17, and their respective upper faces carry spaced apart coaxial outer and inner bearings 18 and 19. A horizontal shaft 20 is journaled in said bearings and its axis of rotation lies substantially in the plane of the upper face of the conveyor 10 at right angles to the direction of travel thereof.

A tilter arm 21 is mounted on shaft 20 and normally extends toward the entry end of the conveyor 10. This arm contains two bores 22 and 23 which receive slidable shafts 24 and 25. These shafts extend parallel to shaft 20, are located above the conveyor level, and have a ram 26 fixed to their inner ends. A double-acting fluid pressure cylinder 27 is housed within arm 21 between the bores 22 and 23, and its piston rod is connected to the mid-portion of ram 26 through a clevis 28. The cylinder is adapted to project and retract the ram, which partially overlies the conveyor when projected. A clamp arm 29 is pivoted to ram 26, extends toward the entry end of the conveyor, and carries a clamp 30 pivoted thereto adjacent its free end. The ram and clamp have article engaging faces 31 and 32 whose curvature conforms approximately with that of an upright article A. A slide 33 extends along the entry end face of arm 21 and is attached at its outer end to shaft 25 and at its inner end to ram 26 to move with the ram. The exposed face of the slide carries a pair of trunnions 34 in which a second double-acting fluid pressure cylinder 35 is pivoted. The piston rod from this cylinder is connected to the free end of the clamp arm 29 for opening and closing the clamp 30.

Shaft 20 also carries an operating lever 36 which extends in a direction approximately opposite to the tilter arm 21 and preferably is integral therewith. The platform 17 of the frame carries a pair of upstanding trunnions 37 in which a double-acting fluid pressure cylinder 38 is pivoted. The piston rod from cylinder 38 is connected to the free end of the operating lever 36 through a clevis 39. Normally the piston in this cylinder is retracted so that the tilter arm 21 remains in its aforementioned normal position extending toward the entry end of the conveyor 10. When the piston is projected, the tilter arm and parts carried thereby swing upwardly substantially a quarter revolution about the axis of the shaft 20.

In operation, the pistons in cylinders 35 and 38 of both mechanisms 12 and 12a initially are retracted and those in cylinders 27 projected. Thus the article engaging faces 31 on both rams 26 overlie the conveyor 10. When an upright article A on the conveyor engages these faces, the conveyor is stopped and the pistons in cylinders 35 are projected, whereupon the article engaging faces 32 on both clamps 30 also engage the article. Next the pistons in both cylinders 38 are projected, whereupon the tilter arms 21 swing upwardly about the axis of shaft 20 with the article clamped between them. Normally the article itself has sufficient rigidity to assure that the two tilter arms move uniformly, but if necesary these arms can be connected through any suitable equalizer mechanism. The article engaging faces 31 on the rams 26 are offset toward the entry end from the axis of rotation; consequently when rotation starts, the article immediately is lifted clear of the conveyor and there is no tendency to damage its edges.

After the tilter arms swing a quarter revolution and the central axis of the article is horizontal, the movement stops. The pistons in cylinders 27 are retracted to move the rams 26 clear of the article and place it back on the same conveyor 10 in its downtilted position. Thereafter the various pistons are returned to their initial position to reset the apparatus, and the conveyor is started again.

Our apparatus is readily adapted for automatic actuation. It is necessary only to equip the fluid lines to the various cylinders with conventional solenoid operated valves, and to provide an electric circuit having conventional limit switches for operating these valves and stopping and starting the conveyor in the sequence described. Inasmuch as control systems for accomplishing operations of this nature are well known, in the interest of simplicity no showing is made herein. Otherwise our apparatus can be actuated by manually operating the necessary valves and switches.

While we have shown and described only a single embodiment of the invention, it is apparent that modifications may arise. Therefore, we do not wish to be limited to the disclosure set forth but only by the scope of the appended claims.

We claim:

1. A handling mechanism adapted to cooperate with a similar such mechanism spaced therefrom and of opposite hand, said mechanism comprising a frame, a tilter arm supported on said frame for rotation on a horizontal axis, a ram slidably supported on said arm, clamp means pivotally supported on said ram, said ram and clamp means having cooperating article engaging faces offset from said axis, and motive means for operating said arm, ram and clamp means.

2. A handling mechanism adapted to cooperate with a similar such mechanism spaced therefrom and of opposite hand, said mechanism comprising a frame, a shaft mounted on said frame, a tilter arm mounted on said shaft for rotation on a horizontal axis, a ram slidably supported on said arm and having a curved article engaging face offset from said axis, clamp means pivotally supported on said ram and having a cooperating curved article engaging face, and motive means for operating said arm, ram and clamp means.

3. A handling mechanism adapted to cooperate with a similar such mechanism spaced therefrom and of opposite hand, said mechanism comprising a frame, a shaft mounted on said frame, a tilter arm mounted on said shaft for rotation on a horizontal axis, motive means supported on said frame for operating said arm, a ram slidably supported on said arm for movement in a direction parallel to said axis and having an article engaging face offset from this axis, motive means supported on said arm for operating said ram, clamp means pivotally supported on said ram and having a cooperating curved article engaging face, and motive means supported on said ram for operating said clamp means.

4. A handling mechanism adapted to cooperate with a similar such mechanism spaced therefrom and of opposite hand, said mechanism comprising a frame, a shaft mounted on said frame, a tilter arm mounted on said shaft for rotation on a horizontal axis, an operating lever connected to said arm, fluid pressure motive means pivotally supported on said frame and connected to said lever for operating said arm, a pair of horizontally slidable shafts supported on said arm and being parallel to said first named shaft, a ram carried by said slidable shafts and having a curved article engaging face offset from said axis, fluid pressure motive means supported on said arm for operating said ram, clamp means pivotally supported on said ram and having a cooperating curved article engaging face, and fluid pressure motive means pivotally supported on said ram for operating said clamp means.

5. A downtilting apparatus which includes a pair of spaced handling mechanisms of similar construction but of opposite hand, each of said mechanisms comprising a frame, a tilter arm supported on said frame for rotation on a horizontal axis coaxial with that on the other mechanism, a ram slidably supported on said arm for movement in a direction parallel to said axis toward and away from the other mechanism, clamp means pivotally supported on said ram, said ram and clamp means having cooperating article engaging faces offset from said axis, and motive means for operating said arm, ram and clamp means.

6. A downtilting apparatus which includes a pair of spaced handling mechanisms of similar construction but of opposite hand, each of said mechanisms comprising a frame, a shaft mounted on said frame, a tilter arm mounted on said shaft for rotation on a horizontal axis coaxial with that on the other mechanism, motive means supported on said frame for operating said arm, a ram slidably supported on said arm for movement in a direction parallel to said axis toward and away from the other mechanism and having a curved article engaging face offset from this axis, motive means supported on said arm for operating said ram, clamp means pivotally supported on said ram and having a cooperating curved article engaging face, and motive means supported on said ram for operating said clamp means.

7. The combination, with a conveyor, of a downtilting apparatus which includes a pair of opposed handling mechanisms of opposite hand located on opposite sides of said conveyor, each of said mechanisms comprising a frame, a tilter arm supported on said frame for rotation on a horizontal axis normal to the direction of conveyor travel and coaxial with that on the other mechanism, a ram slidably supported on said arm for movement in a direction parallel to said axis toward and away from said conveyor, clamp means pivotally supported on said ram, said ram and clamp means having cooperating article engaging faces offset from said axis and adapted to overlie said conveyor, and motive means for operating said arm, ram and clamp means.

8. The combination, with a conveyor, of a downtilting apparatus which includes a pair of opposed handling mechanisms of opposite hand located on opposite sides of said conveyor, each of said mechanisms comprising a frame, a shaft mounted on said frame, a tilter arm mounted on said shaft for rotation on a horizontal axis normal to the direction of conveyor travel and coaxial with that on the other mechanism, motive means supported on said frame for operating said arm and rotating it a quarter revolution, a ram slidably supported on said arm for movement in a direction parallel to said axis toward and away from said conveyor and having a curved article engaging face offset from this axis and adapted to overlie said conveyor, motive means supported on said arm for operating said ram, clamp means pivotally supported on said ram and having a cooperating curved article engaging face, and motive means supported on said ram for operating said clamp means.

9. The combination, with a conveyor having a carrying face lying in a single plane, of a downtilting apparatus which includes a pair of opposed handling mechanisms on opposite sides of said conveyor, said handling mechanisms comprising cooperable means for engaging and clamping an upright article supported on said carrying face, means for turning said cooperable means and an article clamped thereby a quarter revolution on a horizontal axis normal to the direction of conveyor travel, said cooperable means when thus turned holding the article immediately over said carrying face but with the article downtilted 90°, and means for releasing said cooperable means when thus turned to return the article to said carrying face where it is supported in the original plane but in a downtilted position.

10. The combination, with a conveyor having a carrying face lying in a single plane, of a downtilting apparatus which includes a pair of opposed handling mechanisms on opposite sides of said conveyor, said handling mechanisms comprising means for engaging an upright article supported on said carrying face, clamping means cooperable with said engaging means for holding the article thereagainst, means for turning said engaging and clamping means and an article held thereby a quarter revolution on a horizontal axis normal to the direction of conveyor travel, said engaging and clamping means when thus turned supporting the article immediately over said carrying face but with the article downtilted 90°, and means for releasing said engaging means from the article when thus turned to return the article to said carrying face where it is supported in the original plane but in a downtilted position.

References Cited in the file of this patent

UNITED STATES PATENTS

| | | |
|---|---|---|
| 1,401,429 | Moone | Dec. 27, 1921 |
| 1,615,965 | Straight | Feb. 1, 1927 |
| 2,697,529 | Hubbell | Dec. 21, 1954 |
| 2,739,691 | Boehm | Mar. 27, 1956 |